3,198,636
PRESERVATION OF WINE
Robert J. Bouthilet, Modesto, Calif., assignor to Norda Essential Oil and Chemical Company, New York, N.Y., a corporation of New York
No Drawing. Filed June 8, 1962, Ser. No. 200,917
4 Claims. (Cl. 99—35)

This invention relates to the preservation or stabilization of wine.

Materials subject to microbial deterioration can be preserved if the material is put in a hermetically sealed vessel, and the organisms present therein are destroyed. The canning of fresh fruit and vegetables is a typical example of this type of preservation. Pasteur pointed out that certain materials can be preserved by heating the material above a certain minimum temperature but at a temperature not so high as in sterilization, and then filling while hot into a vessel wihch is subsequently closed, and that it is not necessary to seal the material in the vessel prior to the heating. Pasteurization of milk is an outstanding example of this type of process. These methods are effective, but not all materials can be subjected to the high temperatures required without some effect on flavor or appearance.

Certain chemicals are capable of inhibiting microbial deterioration. Among the substances which have been used for this purpose are acetic acid, benzoic acid, boric acid, formic acid, monochloracetic acid, salicylic acid, sorbic acid and sulfurous acid or sulfur dioxide. These substances attack the micro-organism directly through common living systems thereof, and thus in large amounts are toxic to humans to a certain extent, some more than others. Moreover, in the amounts needed to achieve complete cessation of microbial activity, flavor also may be affected adversely.

U.S. Patent No. 2,910,400 to Bernhard et al., issued October 27, 1959, employs the pyrocarbonic acid esters for this purpose. These esters are effective against microorganisms, and are also non-toxic, because they decompose into relatively innocuous substances, including carbon dioxide, the corresponding alcohol, and esters of the alcohol. Hence, the pyrocarbonic acid esters are particularly advantageous for use with alcoholic beverages, inasmuch as the decomposition products of these esters are components normally present in the beverage.

Both the pyrocarbonic acid esters and the organic acids mentioned above have the advantage of permitting the preservation of the material without the necessity of heating, but this advantage is to a certain degree offset by the fact that large amounts of the latter can of course detrimentally affect flavor and appearance, while the esters are rather expensive.

In accordance with the invention, it has been determined that the combination of sulfur dioxide and pyrocarbonic acid esters is far more effective than either alone in the same amount. The enhanced effectiveness that is obtained can be described as synergistic. It would be assumed that the sulfur dioxide and the pyrocarbonic acid esters would attack the organisms in the normal way, and that if these compounds had differing toxic effects upon various organisms, such effects would be merely additive. Accordingly, the disclosure of a synergistic effectiveness, greater than the additive effect, is entirely unexpected.

The treatment with sulfur dioxide and with the pyrocarbonic acid esters can be carried out simultaneously or sequentially. Usually, it is desirable to treat the material with sulfur dioxide, and then add the pyrocarbonic acid ester just prior to packaging the material in a closed container, inasmuch as the pyrocarbonic acid esters are relatively unstable in solution, and thus premature decomposition of the ester, reducing the amount available for effective preservation, is thereby avoided.

Quite small amounts of the sulfur dioxide and of the pyrocarbonic acid esters can be employed in the process of the invention, much smaller amounts than would be required in the case of either alone, because of the enhanced effect. This holds the effect on flavor to a minimum.

In general, amounts within the range from about 0.005 to about 2% by weight of each material can be used, preferably amounts within the range from about 0.01 to about 1%. The two components of the combination of the invention preferably are employed in approximately equal quantities, but ratios of from 5:1 to 1:5 have been employed with satisfactory results. It will, of course, be understood that as the amount of the one component is decreased below the ranges stated, the enhanced effectiveness is greatly diminished, because there is an insufficient amount of that component to synergize the effectiveness of the other.

The pyrocarbonic acid esters which are employed in accordance with the invention can be defined by the general formula

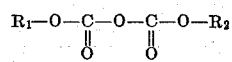

wherein $R_1$ and $R_2$ are each hydrocarbon radicals having from one to about twenty-four carbon atoms. The hydrocarbon radical can be an open chain or cyclic radical, for example: alkyl radicals such as methyl, ethyl, n-propyl, isopropyl, butyl, isobutyl, sec-butyl, tert-butyl, isoamyl, amyl, tert-amyl, isohexyl, isooctyl, 2 - ethylhexyl, decyl, dodecyl, octadecyl, and behenyl; aryl radicals such as phenyl and naphthyl, mixed alkyl aryl radicals such as benzyl, $\alpha$- and $\beta$-phenethyl, xylyl, tolyl, and dimethylphenyl; and cylcoalkyl radicals such as cyclohexyl and cyclopentyl. The hydrocarbon radicals can also include inert substituents, for example, halogen, such as chlorine or bromine, and ether oxygen, such as alkoxy and oxy-heterocyclic radicals such as furfuryl and furyl. Exemplary pyrocabonic acid esters are diethylpyrocarbonate, diisobutylpyrocarbonate, diphenylpyrocarbonate, dibenzylpyrocarbonate, phenylethylpyrocarbonate, ditolylpyrocarbonate, dicyclohexylpyrocarbonate, and difurfurylpyrocarbonate.

The sulfur dioxide can be added as the gas or liquid or in the form of a salt which decomposes in situ to give sulfur dioxide. The addition of salts which leave undesirable residues in the product should be avoided, and normally it is preferable to incorporate either sulfur dioxide or alkali metal sulfites such as sodium or potassium sulfite or sodium or potassium meta-bisulfite.

The process of the invention is effective for the preservation of all kinds of materials of vegetable or animal origin, but it is particularly effective for fermentable beverages, such as wines. Upon addition of the preservatives, fermentation is arrested indefinitely while the material is kept in a closed container.

It will be understood that in addition to the sulfur dioxide and pyrocarbonic acid esters, any of the known supplemental preservative materials, flavoring materials, colors and the like can be incorporated. However, so far as is presently known, the synergistic effect is obtained only from the combination of sulfur dioxide and pyrocarbonic acid esters.

Following the addition of the two preservatives in accordance with the invention, the material is placed in a closed container. Sealing is desirable, but not essential. The packaged product can be kept in the normal way, and can be preserved indefinitely while it is kept closed.

Because of the very small amounts of the two preservatives required, due to the synergistic effect, much less than the usual amounts of each preservative being sufficient to prevent fermentation for an indefinite period, there is virtually no flavor contamination, nor is there any effect upon the other desirable properties of the material. This is to be contrasted with prior chemical preservation procedures, where relatively large amounts of chemicals are required to obtain an effective preservation or stabilization.

The following examples, in the opinion of the inventor, represent preferred embodiments of the invention.

EXAMPLES 1 TO 10

Separate batches of grape juice were contaminated using one of the various microorganisms listed in Table I for each batch, samples were plated out, and examined to determine the count present. Then, five samples of each contaminated batch were taken in vials, and treated with the level of sulfur dioxide listed. The vials were allowed to stand for thirty minutes, and then cell counts were taken again to determine the effective kill.

It is evident from the above data that in each case, at 20 parts per million of sulfur dioxide and diethylpyrocarbonate, together, the organism was completely destroyed. In order to obtain this result with sulfur dioxide or diethylpyrocarbonate alone, as much as 100 parts per million of each had to be used, depending on the organism. Thus, the synergistic effect is far more than the additive effect which would be expected to be the effect at 40 parts per million of sulfur dioxide, or diethylpyrocarbonate, alone.

EXAMPLE 11

Grape must in fermentation (low wines) was treated by addition of 30 parts per million of sulfur dioxide. No effect on the rate of fermentation was evident. An additional 50 parts per million of sulfur dioxide were added, but this likewise had no change on fermentation rate. An additional 50 parts per million gave no observable effect. Further additions were made, but in order to interrupt the fermentation completely it was necessary to raise the sulfur dioxide concentration to 1000 parts per

*Table I*

| Example No. | Organism | Original Count | Count after addition of $SO_2$ in parts per million | | | | |
|---|---|---|---|---|---|---|---|
| | | | 20 | 40 | 100 | 200 | 300 |
| 1 | Saccharomyces pastorianus | 500,000 | 500,000 | 400,000 | None | None | None |
| 2 | Saccharomyces elipsoideus, 522 | 400,000 | 400,000 | 400,000 | 400,000 | 200,000 | None |
| 3 | Saccharomyces elipsoideus, 522 adapted to high $SO_2$ | 10,000,000 | 10,000,000 | 10,000,000 | 10,000,000 | 10,000,000 | 10,000,000 |
| 4 | Pichia farinosa | 600,000 | 600,000 | 100,000 | None | None | None |
| 5 | Bacterium butyrifacens | 300,000 | 300,000 | 60,000 | None | None | None |
| 6 | Acetobacter suboxydans | 400,000 | 400,000 | None | None | None | None |
| 7 | Clostridium acetobutylicum | 300,000 | 300,000 | 200,000 | None | None | None |
| 8 | Penicillium griseofulvum | Heavy | Heavy | Light | Light | Light | None |
| 9 | Aspergillus flavus | Heavy | Heavy | Heavy | Light | Light | Light |
| 10 | Rhisopus elegans | Light | Light | None | None | None | None |

From the same batches of grape juice were then taken four vital samples which weer inoculated with diethylpyrocarbonate in the amounts given in Table II. The vials were allowed to stand for thiry minutes, and the cell count then determined. The results are given in Table II.

million. At this high concentration, the wine was unpalatable and unfit to drink.

To the same must was added 20 parts per million of sulfur dioxide, and a further 20 parts per million of diethylpyrocarbonate. Fermentation ceased almost immedi-

*Table II*

| Example No. | Organism | Original Count | Count after addition of Diethylpyrocarbonate in p.p.m. | | | |
|---|---|---|---|---|---|---|
| | | | 20 | 50 | 100 | 150 |
| 1 | Saccharomyces pastorianus | 400,000 | 400M | 250M | None | None |
| 2 | Saccharomyces elipsoideus, 522 | 400,000 | 300M | 300M | None | None |
| 3 | Saccharomyces elipsoideus, 522 adapted to high $SO_2$ | 600,000 | 600M | None | None | None |
| 4 | Pichia farinosa | 500,000 | 400M | 100M | None | None |
| 5 | Bacterium butyrifacens | 300,000 | None | None | None | None |
| 6 | Acetobacter suboxydans | 400,000 | 400M | 200M | None | None |
| 7 | Clostridium acetobutylicum | 300,000 | 200M | None | None | None |
| 8 | Penicillium griseofulvum | Heavy | Heavy | Heavy | Light | Light |
| 9 | Aspergillus flavus | Heavy | Heavy | Heavy | Light | None |
| 10 | Rhisopus elegans | Light | Light | Very light | None | None |

Further samples of the same batches of contaminated juices were then taken and treated with both 20 parts per million of sulfur dioxide and 20 parts per million of diethylpyrocarbonate. The treated samples were allowed to stand for thirty minutes, and then the cell count taken. The results are given in Table III.

*Table III*

| Ex. No. | Organism | Original Count | Count After Adition |
|---|---|---|---|
| 1 | Saccharomyces pastorianus | 600,000 | None |
| 2 | Saccharomyces elipsoideus, 522 | 5,000,000 | None |
| 3 | Saccharomyces elipsoideus, 522 adapted to high $SO_2$ | 6,000,000 | None |
| 4 | Pichia farinosa | 200,000 | None |
| 5 | Bacterium butyrifacens | 400,000 | None |
| 6 | Acetobacter suboxydans | 400,000 | None |
| 7 | Clostridium acetobutylicum | 300,000 | None |
| 8 | Penicillium griseofulvum | Heavy | None |
| 1 | Aspergillus flavus | Light | None |
| 90 | Rhisopus elegans | Light | None | ately. The product was bottled and the bottles closed. The bottles were observed for three weeks, but there was no change, other than sedimentation, and no fermentation was observed after this period. The flavor of the wine was sound, unchanged from the time of bottling.

EXAMPLE 12

Finished California sauternes containg 3% residual sugar were bottled under the following conditions:

(1) One batch was bottled with 150 parts per million of sulfur dioxide.

(2) One batch was bottled with 50 parts per million of diethylpyrocarbonate.

(3) A third batch was bottled with 20 parts per million of sulfur dioxide and 20 parts per million of diethylpyrocarbonate.

All of the bottles were hermetically sealed, and kept at room temperature for three days. They were then examined without opening. The first two exhibited a considerable haze, due to fermentation, i.e., growth of microorganisms, whereas the third batch remained clear. Two days later the bottles of the first two batches were opened, and found to be actively fermented. On the other hand, the bottles treated with both sulfur dioxide and diethylpyrocarbonate were still clear, and accordingly were kept for another two weeks. They were then opened and tasted, and found to be sound wine, substantially unchanged from the time of bottling.

I claim:

1. A process for preserving wines containing carbohydrates, and susceptible to enzymatic decomposition through fermentation, which comprises incorporating with the perishable material sulfur dioxide and a non-toxic pyrocarbonic acid ester, each in an amount within the range from about 0.005 to about 2% by weight, and in a weight ratio of from about 5:1 to about 1:5 sufficient to lessen microbiological deterioration of the material due to any microorganism selected from the group consisting of *Saccharomyces pastorianus, Saccharomyces elipsoideus, Pichia farinosa, Bacterium butyrifacens, Acetobacter suboxydans, Clostridium acetobutylicum, Penicillium griseofulvum, Aspergillus flavus* and *Rhisopus elegans*, the sulfur dioxide and pyrocarbonic acid ester each synergizing the effectiveness of the other.

2. A process in accordance with claim 1 wherein the pyrocarbonic acid ester has the formula

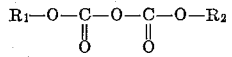

wherein $R_1$ and $R_2$ are organic hydrocarbon radicals.

3. A process in accordance with claim 1 in which the pyrocarbonic acid ester is diethylpyrocarbonate.

4. A process in accordance with claim 1 wherein the sulfur dioxide is added in the form of an inorganic sulfite.

References Cited by the Examiner

UNITED STATES PATENTS

| 2,249,262 | 7/41 | Thomas | 99—35 |
| 2,910,400 | 10/59 | Bernhard et al. | 99—150 X |

A. LOUIS MONACELL, *Primary Examiner.*

ABRAHAM H. WINKELSTEIN, *Examiner.*